United States Patent
Bonvicini et al.

[15] 3,668,280
[45] June 6, 1972

[54] DYE-RECEPTIVE POLYOLEFIN TEXTILE FIBERS COMPRISING SYNTHETIC HIGH POLYMERS, AND PROCESS FOR THEIR PREPARATION

[72] Inventors: Alberto Bonvicini; Giuseppe Cantatore, both of Terni, Italy

[73] Assignee: Montecatini Edison S.p.A., Milan, Italy

[22] Filed: Feb. 24, 1970

[21] Appl. No.: 13,811

[30] Foreign Application Priority Data

Feb. 26, 1969  Italy..................13.333 A/69

[52] U.S. Cl. ...........................260/897 B, 8/180, 260/41 C, 260/829, 260/896, 260/897 R, 260/898, 264/78, 264/176 F, 264/210
[51] Int. Cl. .................................................C08f 21/12
[58] Field of Search................260/897 B, 897 R, 829, 898, 260/896

[56] References Cited
UNITED STATES PATENTS

| | | | |
|---|---|---|---|
| 3,303,148 | 2/1967 | Joyner et al. | 260/17 |
| 3,299,185 | 1/1967 | Kyoto et al. | 260/897 |

*Primary Examiner*—Murray Tillman
*Assistant Examiner*—C. Seccuro
*Attorney*—P. Q. Peake and Stevens, Davis, Miller & Mosher

[57] ABSTRACT

There are disclosed dyeable fibers comprising mixtures of olefinic polymers with terpolymers of (a) vinyl or isopropenyl derivatives of aromatic hydrocarbons, such as styrene, vinyltoluene, alpha-methylstyrene and the like; (b) alpha, beta-unsaturated nitriles, such as acrylonitrile, methacrylonitrile, and the like; and (c) aromatic and cycloaliphatic hydrocarbons, containing a double vinylenic bond, such as indene, acenanaphthylene, cyclohexene, and the like. The olefin polymer may be, and preferably is, a high molecular weight polypropylene consisting essentially of isotactic polypropylene made up of isotactic macromolecules, i.e., of macromolecules having substantially isotactic structure and being non-extractable with boiling n-heptane. A process for preparing the dye-receptive fibers is also disclosed.

20 Claims, No Drawings

DYE-RECEPTIVE POLYOLEFIN TEXTILE FIBERS COMPRISING SYNTHETIC HIGH POLYMERS, AND PROCESS FOR THEIR PREPARATION

THE PRIOR ART

The use of a styrene/acrylonitrile copolymer as a tinctorial modifier of polypropylene is proposed in French Pat. No. 1,283,526, to Kureha Kasei.

Three-component copolymers of styrene, acrylonitrile and a third vinylic polar monomer, for instance, vinylpyridine, vinylpyrrolidone, acrylamide, acrylic esters and the like, are proposed as additives for dyeable polyolefinic fibers in Japanese Pat. No. 1713/65, to Nitto Spinning.

The copolymers and terpolymers suggested in said prior art have a number of drawbacks due to the poor compatibility thereof with polypropylene. The disadvantages are manifested especially in a tendency of those copolymers and terpolymers to "bleed" to the surface of the fibers, both during processing of the fiber and dyeing thereof.

THE PRESENT INVENTION

The primary object of this invention was to provide new modifiers for polyolefins which exhibit improved compatibility with the polyolefins and which, when incorporated in the polyolefins, result in fibers from which the modifier does not exude and which have excellent receptivity for all kinds of dyes, in particular dyes of the plastosoluble class.

This and other objects are achieved by the invention in accordance with which terpolymers of styrene (or derivatives thereof), acrylonitrile (or derivatives thereof), and non-polar monomers including indene, acenanaphthylene, cyclohexene and the like, are mixed with the polyolefins in an amount of from 1 percent to 20 percent by weight, preferably from 2 percent to 10 percent by weight, and the mixture is melt-spun to form fibers.

The non-polar monomers used as third component of the terpolymers modifiers include indene, mixtures of indene and coumarone, acenanaphthylene, cyclohexene, cyclopentene, alpha-pinene, norbornene, and the like.

The polyolefin to which the modifying terpolymer is added is preferably a high molecular weight, fiber-forming polymer of a higher alpha-olefin consisting essentially of isotactic macromolecules and obtained, for instance, by polymerizing the higher alpha-olefin at low pressure and in contact with catalysts which polymerize the higher alpha-olefins by a stereospecific mechanism. In the presently preferred embodiment the polyolefin is normally crystalline polypropylene consisting essentially of isotactic polypropylene made up of isotactic macromolecules.

However, other crystalline polyolefins obtained from monomers of the formula $CH_2 = CHR$ in which R is hydrogen, or an alkyl or aryl group, and including polyethylene, polybutene-1, polypentene-1, polyhexene-1, poly-4-methylpentene-1, polyoctene-1, polystyrene, and so on, as well as ethylene-propylene copolymers can be modified in accordance with this invention.

Mixing of the polyolefins and modifying terpolymers is generally carried out by mixing the two materials together in powder form. However, it is also possible to incorporate the modifying terpolymers in the polyolefin by other methods, as by mixing the polyolefin with a solution of the modifying terpolymer in a suitable solvent, followed by evaporation of the solvent, or by adding the modifying copolymer to the polyolefin during, or at the end of the polymerization of the monomer $CH_2 = CHR$.

During the mixing, other adjuvants, such as dulling agents, pigments, organic or inorganic dyes, stabilizers, lubricants, dispersing agents and the like, may also be included in the mixture of polyolefin and modifying terpolymer.

For preparing yarns (threads), the mixtures are granulated and then extruded through suitable melt-spinning equipment, in the absence of oxygen and, preferably, in an inert gas (nitrogen) atmosphere.

The filaments thus obtained may be subjected to stretching at stretch ratios comprises between 1:2 and 1:20, at temperatures of from 80° C. to 150° C., on stretching devices heated in any suitable way, as by hot air, vapor, or other like fluid, or provided with a heating plate. The filaments can be subjected to strong orientation after extrusion as described in the Italian Pat. Nos. 577,545, 614,048, and 688,502 of Montecatini.

The filaments or threads can be dimensionally stabilized in a free-to-shrink condition, or under conditions of controlled shrinkage, at temperatures of from 80° C. to 160° C. and as described in the Italian Pat. Nos. 566,914 and 588,318 of Montecatini.

The spinning can be carried out using conventional spinnerets, preferably spinnerets having holes with an individual diameter greater than 0.5 mm. and a length/diameter ratio greater than 1.1, but preferably of from 10 to 30. The spinneret holes may have a circular or non-circular transverse cross-section.

The dyeable compositions of the invention may form the core or the sheath of fibers of the core-and-sheath type.

Then yarns obtained by extrusion of the mixtures according to the invention may be either mono- or multi-filament yarns and are used, for example, in the preparation of either continuous yarn or tops, bulk yarns and bulk fibers, non-woven (spun-bonded and non-woven, in general) structures. In addition, the mixtures of polypropylene and modifying terpolymer can be used for preparing films, strips, and shaped objects generally.

The fibers and other articles formed from the mixtures exhibit a marked receptivity for dyes, in particular for plastosoluble (disperse) dyes, and the fibers and other articles dyed with such dyes show excellent light-fastness and resistance to washing and rubbing.

The following examples, in which parts are by weight unless otherwise specified, are given to illustrate the invention and are not intended to be limiting.

EXAMPLE 1

A styrene/acrylonitrile/indene terpolymer was prepared as follows:

| | |
|---|---|
| styrene | 250 g |
| acrylonitrile | 125 g |
| indene | 125 g |
| water | 800 cc |
| sodium-laurylsulphate | 10 g |
| $Na_2S_2O_8$ | 2 g |
| $NaHSO_3$ | 1 g | were mixed together and the mixture was then heated for 2 hours at 80° C. under constant stirring. Another 2 g of $Na_2S_2O_8$ and 1 g of $NaHSO_3$ were added, whereupon the heating at 80° C. was continued for further 4 hours. The terpolymer thus obtained was precipitated with $CaCl_2$, filtered, washed and dried.

400 g of the terpolymer obtained, having an intrinsic viscosity of 0.40 (measured at 25° C. on a 0.5 percent chloroformic solution), were mixed with 9,600 g of polypropylene (melt index = 25.2; ashes = 0.006 percent, residue of extraction with heptane = 97.2 percent i.e., a polypropylene consisting essentially of isotactic polypropylene made up of isotactic macromolecules). This mixture was extruded at 220° C. and the granulate obtained was transformed into fibers under the following conditions:

| | |
|---|---|
| Spinning: | |
| temperature of extruding screw | 230°C |
| temperature of extrusion head | 235°C |
| temperature of spinneret | 235°C |

The spinneret had 60 holes of 0.8 mm diameter each and capillary length of 16 mm;

| | |
|---|---|
| maximum pressure | 50 kg/cm² |
| winding up speed | 400 mt/min. |
| Stretching: | |

| temperature (vapor medium) | 130°C |
| --- | --- |
| stretch ratio | 1 : 5 |

The fibers thus obtained showed a good receptivity for the following disperse dyes:
1. Yellow Latyl 4RL    Supplement C.I. Disperse Yellow 23
2. Yellow Tersetile 5RL    Supplement C.I. Disperse Yellow 7
3. Orange Foron GFL    Supplement C.I. Disperse Orange 20
4. Bright Rose Terasil FG    Supplement C.I. Disperse Red 55
5. Bordo Latyl B    Supplement C.I. Disperse Violet 26
6. Bright Blu Setacyl BC    C.I. Disperse Blue 3

The dyed fibers showed a good light fastness, resistance to washing and rubbing.

EXAMPLE 2

A styrene/acrylonitrile/indene terpolymer was prepared as in Example 1, starting from the following composition of monomers:

| styrene | 350 g |
| --- | --- |
| acrylonitrile | 75 g |
| indene | 75 g |

600 g of such terpolymer have ing intrinsic viscosity of 0.55, were mixed with 9,400 g of polypropylene (melt index = 25.2; ashes = 0.006 percent; residue of heptane extraction = 97.2 percent. This mixture was then extruded at 220° C. and the granulate thus obtained was transformed into fibers under the following conditions:

| spinning: | | |
| --- | --- | --- |
| temperature of extruding screw | | 235°C |
| temperature of extruder head | | 240°C |
| temperature of spinneret | | 240°C |
| spinneret: | 60 holes | (0.8/16 mm) |
| maximum pressure | | 51 kg/sq. cm |
| winding up speed | | 400 mt/min. |
| stretching: | | |
| temperature (in vapor atmosphere) | | 130°C |
| stretch ratio | | 1 : 5 |

The fibers obtained showed a good receptivity for disperse dyes like those cited in Example 1. The dyed fibers were fast to light, and resistant to washing and to rubbing.

EXAMPLE 3

A styrene/acrylonitrile/acenaphthylene terpolymer was prepared by the process described in Example 1. The percent-by-weight ratio of the monomers used was the following:
styrene : 50/acrylonitrile : 25/acenaphthylene : 25.

The copolymerization was conducted in the presence of laurylmercaptan (0.5 percent on the total monomers).

500 g of the terpolymer thus obtained, having intrinsic viscosity of 0.54, were mixed with 9,500 g of polypropylene (melt index = 25.2; ashes = 0.006 percent; residue of the heptane extraction = 97.2 percent).

This mixture was then extruded at 210° C. and transformed into a granulate which was used for the preparation of fibers, operating under the following conditions:

| spinning: | | |
| --- | --- | --- |
| temperature of extruding screw | | 230°C |
| temperature of extruder head | | 235°C |
| temperature of spinneret | | 235°C |
| spinneret: | 60 holes | (0.8/16 mm) |
| stretching: | | |
| temperature (in vapor atmosphere) | | 130°C |
| stretch ratio | | 1 : 5 |

The fibers thus obtained showed a good receptivity for the disperse dyes cited in Example 1, and the dyed fibers were fast to light, and resistant to washing and to rubbing.

EXAMPLE 4

A styrene/acrylonitrile/acenaphthylene terpolymer was prepared by the process described in Example 1. The by-weight percent ratio of the monomers was as follows:
styrene : 70/acrylonitrile : 22/acenaphthylene : 8.

The copolymerization was conducted in the presence of 0.5 percent of laurylmercaptan with respect to the total monomers.

500 g of the terpolymer thus obtained, having intrinsic viscosity of 0.95, were mixed with 9,500 g of polypropylene (melt index = 25.2; ashes = 0.006 percent; residue of heptane extraction = 97.2 percent). This mixture was extruded at 220° C. and was then transformed into a granulate. The granulate was used for preparing fibers, operating under the following conditions:

| spinning: | | |
| --- | --- | --- |
| temperature of extruding screw | | 230°C |
| temperature of extruder head | | 235°C |
| temperature of spinneret | | 235°C |
| spinneret: | 60 holes | (0.8/16 mm) |
| stretching: | | |
| temperature (in vapor atmosphere) | | 130°C |
| stretch ratio | | 1 : 5 |

The fibers obtained showed a good receptivity for the disperse dyes cited in Example 1. The dyed fibers were light-fast, and resistant to washing and rubbing.

EXAMPLE 5

A styrene/acrylonitrile/cyclohexene terpolymer was prepared under the following conditions:

| styrene | 250 g |
| --- | --- |
| acrylonitrile | 125 g |
| cyclohexene | 125 g |
| water | 1000 cc |
| laurylsulphate sodium | 10 g |
| $Na_2S_2O_8$ | 2 g |
| $NaHSO_3$ | 1 g | were mixed together and the mixture was heated at 80° C. for 2 hours under stirring. There were then added another 2 g of $Na_2S_2O_8$ and 1 g of $NaHSO_3$, and the heating was continued for a further 2 hours. Thereupon, there were added a further 2 g of $Na_2S_2O_8$ and 1 g of $NaHSO_3$, carrying on the heating for another 2 hours. The terpolymer thus obtained was precipitated with $CaCl_2$, was then filtered, washed and finally dried.

500 g of the terpolymer obtained, having intrinsic viscosity = 0.75, were mixed with 9,500 g of polypropylene (melt index = 25.2; ashes = 0.006 percent; residue of heptane extraction = 97.2 percent).

The mixture obtained was then extruded at 220° C. and the resulting granulate was transformed into fibers under the following spinning conditions:

| spinning: | |
| --- | --- |
| temperature of extruding screw | 230°C |
| temperature of extrusion head | 240°C |
| temperature of spinneret | 235°C |
| spinneret: | 60 holes, 0.8 mm φ, 16 mm capill. length |
| maximum pressure | 50 kg/cm² |
| winding up speed | 400 mt/min. |
| stretching: | |
| temperature (in vapor atmosphere) | 130°C |
| stretch ratio | 1 : 5 |

The fibers thus prepared showed a good receptivity for the disperse dyes cited in Example 1, and the dyed fibers showed good light-fastness and resistance to washing and rubbing.

Fibers and other articles formed from mixtures of crystalline polyethylene or crystalline polymers of the higher alpha-olefins other than propylene and modifying terpolymers as disclosed herein also show improved receptivity for dyes, especially dyes of the plastosoluble class, and have, in the dyed condition, good light-fastness and resistance to washing and abrasion.

Polypropylene consisting essentially of isotactic polypropylene made up of isotactic macromolecules is disclosed in Natta et al. USP 3,112,300.

Manufactured shaped articles which can be prepared and dyed in accordance with the invention includes fibers, films, strips, and molded objects generally.

As will be apparent, some changes and variations may be made in practicing the invention without departing from the spirit thereof. Therefore, we intend to include in the scope of the appended claims all modifications that will be obvious to those skilled in the art from the description and working examples given herein.

What is claimed is:

1. Manufactured dye-receptive articles formed from a mixture of from 80 percent to 99 percent by weight of a crystalline polyalphaolefin and, conversely, from 20 percent to 1 percent of a dyeing modifier which is a terpolymer of (a) a polymerizable monomer selected from the group consisting of vinyl and isopropenyl derivatives of aromatic hydrocarbons; (b) a monomer copolymerizable with monomer (a) and selected from the group consisting of alpha, beta-unsaturated nitriles; and (c) a monomer copolymerizable with monomers (a) and (b) and selected from the group consisting of indene, acenaphthylene, indene/cumarone mixtures, cyclohexene, cyclopentene, alpha-pinene, and norbornene.

2. Manufactured, dye-receptive shaped articles according to claim 1, further characterized in being formed of a mixture of the crystalline polyalphaolefin and from 2 percent to 10 percent by weight of the terpolymer.

3. Manufactured, dye-receptive shaped articles according to claim 1, further characterized in that the dyeing modifier is a terpolymer of (a) a monomer selected from the group consisting of styrene, vinyl toluene, and alpha-methylstyrene; (b) a monomer selected from the group consisting of acrylonitrile and methylacrylonitrile; and (c) a monomer selected from the group consisting of indene, acenaphthylene, indene/cumarone mixtures, cyclohexene, cyclopentene, alpha-pinene, and norbornene.

4. Textile fibers according to claim 1.

5. Textile fibers according to claim 1 and further characterized in that the polyalphaolefin is polypropylene consisting essentially of isotactic polypropylene made up of isotactic macromolecules.

6. Manufactured dye-receptive, shaped articles according to claim 1, further characterized in that the crystalline polyalphaolefin is polyethylene.

7. Manufactured, dye-receptive, shaped articles according to claim 1, further characterized in that the crystalline polyalphaolefin is a copolymer of ethylene and propylene.

8. Dyeable polymeric compositions comprising a crystalline polyalphaolefin and 1 percent to 20 percent by weight of a dyeing modifier which is a terpolymer of (a) a monomer selected from the group consisting of vinyl and isopropenyl derivatives of aromatic hydrocarbons, (b) a monomer selected from the group consisting of alpha, beta-unsaturated nitriles, and (c) a monomer selected from the group consisting of indene, acenaphthylene, indene/cumarone mixtures, cyclohexene, cyclopentene, alpha-pinene, and norbornene.

9. Dyeable polymeric compositions according to claim 8, in the form of textile fibers.

10. Dyeable polymeric compositions according to claim 8, characterized in that the crystalline polyalphaolefin is polypropylene consisting essentially of isotactic polypropylene made up of isotactic macromolecules.

11. Manufactured dye-receptive shaped articles formed from a mixture of from 80 percent to 99 percent by weight of a crystalline polyalphaolefin and, conversely, from 20 percent to 1 percent by weight of a dyeing modifier which is a terpolymer of (a) a polymerizable monomer selected from the group consisting of vinyl and isopropenyl derivatives of aromatic hydrocarbons; (b) a monomer copolymerizable with monomer (a) and selected from the group consisting of alpha, beta-unsaturated nitriles; and (c) indene.

12. Manufactured dye-receptive shaped articles according to claim 11, characterized in being formed of a mixture of the crystalline polyalphaolefin and from 2 percent to 10 percent by weight of the terpolymer.

13. Manufactured, dye-receptive shaped articles according to claim 11, further characterized in that the dyeing modifier is a terpolymer of (a) a monomer selected from the group consisting of styrene, vinyl toluene, and alpha-methylstyrene; (b) a monomer selected from the group consisting of acrylonitrile and methylacrylonitrile; and (c) indene.

14. Textile fibers according to claim 11.

15. Textile fibers according to claim 11, and further characterized in that the crystalline polyalphaolefin is polypropylene consisting essentially of isotactic polypropylene made up of isotactic macromolecules.

16. Manufactured, dye-receptive shaped articles according to claim 11, further characterized in that the crystalline polyalphaolefin is polyethylene.

17. Manufactured, dye-receptive shaped articles according to claim 11, further characterized in that the crystalline polyalphaolefin is a copolymer of ethylene and propylene.

18. Dyeable polymeric compositions comprising a crystalline polyalphaolefin and 1 percent to 20 percent by weight of a dyeing modifier which is a terpolymer of (a) a monomer selected from the group consisting of vinyl and isopropenyl derivatives of aromatic hydrocarbons, (b) a monomer selected from the group consisting of alpha, beta-unsaturated nitriles, and (c) indene.

19. Dyeable polymeric compositions according to claim 18, in the form of textile fibers.

20. Dyeable polymeric compositions according to claim 18, characterized in that the crystalline polyalphaolefin is polypropylene consisting essentially of isotactic polypropylene made up of isotactic macromolecules.

* * * * *